C. R. TRIM.
RESTRAINING DEVICE.
APPLICATION FILED MAY 10, 1916.
1,195,419.
Patented Aug. 22, 1916.
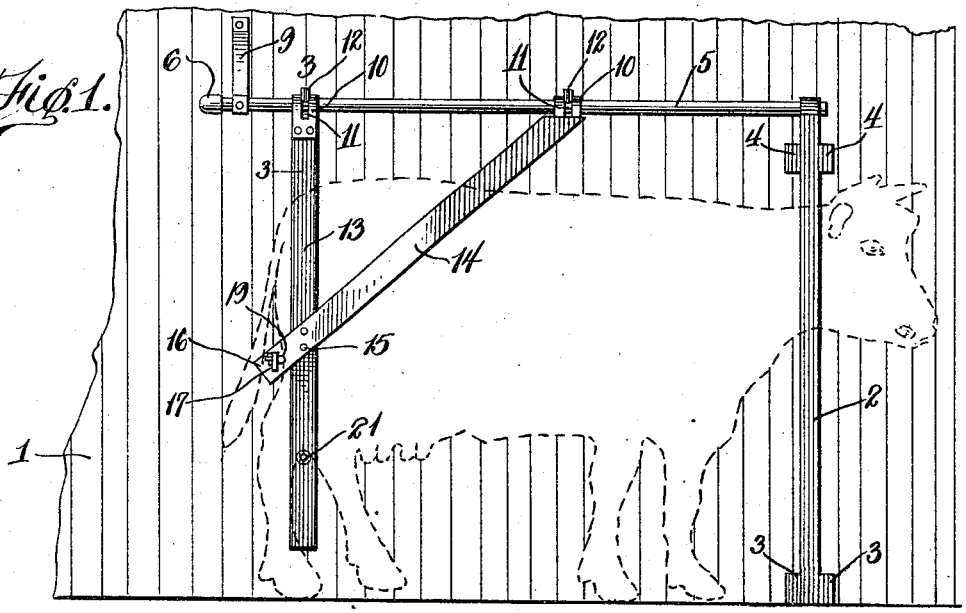
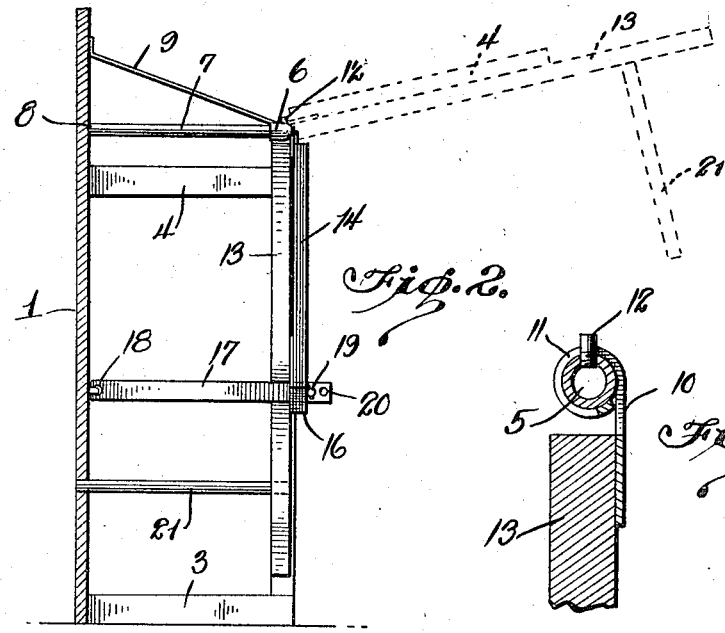
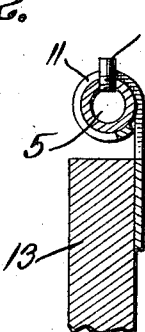
WITNESSES
Howard F. Costello
Wm H Mulligan
INVENTOR
Charles R. Trim
BY Richard Owen
ATTORNEY

UNITED STATES PATENT OFFICE.

CHARLES R. TRIM, OF ORD, NEBRASKA.

RESTRAINING DEVICE.

1,195,419.

Specification of Letters Patent. Patented Aug. 22, 1916.

Application filed May 10, 1916. Serial No. 96,672.

*To all whom it may concern:*

Be it known that I, CHARLES R. TRIM, a citizen of the United States, residing at Ord, in the county of Valley and State of Nebraska, have invented certain new and useful Improvements in Restraining Devices, of which the following is a specification.

This invention relates to a restraining device and more particularly to a device of this character which is employed to prevent a cow or other animal from kicking while it is standing in a stanchion while being milked.

The primary object of the device is to provide a kicking rack which may be employed to break cows of the habit of kicking and to accustom the younger animals to the milking process.

As a further object of the invention the device contemplates the provision of a structure which may be secured to and supported by the wall of a stable or barn, the supporting structure having suspended therefrom the means by which the animal is prevented from kicking while it is standing in the position to be milked.

Another object of the invention is the provision of a restraining bar which is adapted to extend transversely between the hind legs of the animal, the forward end of the supporting structure being shown in a position whereby the head and neck of the animal will be engaged similar to the manner which is accomplished by stanchions of the usual type.

A further object of this invention is the provision of a kicking rack which consists of comparatively few parts and is simple in construction, but durable and well adapted to withstand the rough usage to which devices of this character are ordinarily subjected.

For a full description of the invention and the advantages and merits thereof, reference is to be had to the following description and the accompanying drawings, wherein is illustrated the preferred form of my invention, in which;

Figure 1 is a side elevation showing the animal outlined in dotted lines. Fig. 2 is an end elevation, the dotted lines indicating the open position of the restraining rack. Fig. 3 is an enlarged fragmentary vertical section on the line 3—3 of Fig. 1.

The side wall of the barn or stable is indicated by the numeral 1 and it is my purpose to attach the supporting structure of the device to the wall 1 thereby making it possible to employ the wall as one side of the device. The forward end of the structure consists of an upright bar 2 which is laterally spaced with respect to the wall 1 and its lower end rests upon the ground and is connected to the lower spacing bars 3 which have their ends fastened to the lower end of the bar 2 and their opposite ends secured to the wall 1. A pair of spacing arms 4 are arranged in superposed relation with respect to the spacing bars 3 and have their outward ends secured to the upright bar 2 adjacent to its upper end and their opposite ends are secured to the wall 1. From this construction it will be observed that the forward end of the structure provides a stanchion which is adapted to receive the neck of the animal in a manner similar to that of the ordinary stanchion.

A supporting rod 5 is arranged at the upper portion of the device and has one end connected to the upper end of the upright 2 and its opposite end is mounted in an elbow 6, the opposite end of which has mounted therein the right-angular disposed supporting rod 7. The supporting rod 5 extends longitudinally of the device and at a height sufficient to enable an animal to pass under the supporting rod without interfering therewith. The end of the short supporting rod 7 is connected, as at 8 to the wall 1. For holding the supporting rod in rigid position I provide a bar 9 which has one end secured to the supporting rod 5 and its opposite end fastened to the wall 1.

The rod 5 is formed, it will be noted, of any suitable round material such as gas-pipe or round iron bars and it has mounted thereon a pair of suspension loops 10 which consist of plates of any suitable material bent around the rod and provided with slots 11 through which a pin 12, carried by the rod 5, extends. One of the suspension loops has secured thereto the vertical swinging arm 13 which is of a length sufficient to have its lower end spaced a slight distance above the ground when it is in operative position. The other suspension loop 10 carries one end of the angular brace arm 14, its opposite end being secured by the bolts 15 to the member 13. The angular brace 14 has its end 16 extending beyond the swinging arm 13 and is provided with an aperture for the reception of one end of a locking bar 17. A locking bar 17 is pivotally mounted upon the wall 1 by a staple 18 which extends through an aperture in the end of a lock bar and the free end is adapted to extend through the aperture in the end of the brace bar 14 where it may be locked in a position by the cotter pin 19, the end of the locking bar 17 being provided with a plurality of apertures 20 through one of which the cotter pin 19 may be inserted. The locking bar 17 is constructed of a flat piece of any suitable material extending laterally across the rear of the structure, as shown by the drawing, and by contacting with the thighs of the animal prevents the backward movement of the animal while it is standing in the position shown.

For further limiting the movement of the animal's legs I provided the swinging arm 13 with a restraining bar 21 which is connected at one end to the swinging bar and extends laterally therefrom at a height sufficient to allow it to extend between the hind legs of the animal. As shown by the dotted lines in Fig. 1, the hind legs of the animal are spaced apart, one slightly in advance of the other and it is in this position that is accomplished the desired restraining of the kicking of the animal since, the restraining bar 21 together with the locking bar 17 prevents the animal from moving its hind legs to any material extent.

In reduction to practice I have found that the form of my invention illustrated in the drawings and referred to in the above description, as the preferred embodiment, is the most efficient and practicable, yet realizing that the conditions concurrent with the adoption of my device will necessarily vary, I desire to emphasize the fact that various minor changes in the details of construction, proportion and arrangement of parts may be resorted to, when required, without sacrificing any of the advantages of my invention, as defined in the appended claims.

I claim—

1. A restraining device including a supporting upright mounted in spaced relation to the wall of a building, transversely extending spacing bars connecting said upright to the wall of a building at the top and lower ends thereof, a supporting rod having one end mounted on the top of said upright and extending longitudinally in spaced relation to the wall of the building, said rod being provided with a right angle elbow at its opposite end, a shorter supporting rod having one end secured to the building and extending transversely for securing its opposite end in said elbow, said supporting rod also provided with a brace bar having one end secured to said supporting rod and its opposite end connected to the wall of the building, the said supporting rod being disposed at a height slightly above the height of an ordinary domestic animal, a swinging arm having its upper end provided with a suspension loop through which said supporting rod is extended for permitting a swinging movement of said swinging arm, and a restraining bar carried by said swinging arm and adapted to be thrust between the spaced apart hind legs of an animal, the free end of said restraining bar contacting with the wall of the building when in operative position.

2. A restraining device including a supporting upright mounted in spaced relation to the wall of a building, transversely extending spacing bars connecting said upright to the wall of a building at the top and lower ends thereof, a supporting rod having one end mounted on the top of said upright and extending longitudinally in spaced relation to the wall of the building, said rod being provided with a right angle elbow at its opposite end, a shorter supporting rod having one end secured to the building and extending transversely for securing its opposite end in said elbow, said supporting rod also provided with a brace bar having one end secured to said supporting rod and its opposite end connected to the wall of the building, the said supporting rod being disposed at a height slightly above the height of an ordinary domestic animal, a swinging arm having its upper end provided with a suspension loop through which said supporting rod is extended for permitting a swinging movement of said swinging arm, a restraining bar carried by said swinging arm and adapted to be thrust between the spaced apart hind legs of an animal, the free end of said restraining bar contacting with the wall of the building when in operative position, an angularly disposed brace bar having one end provided with a second suspension loop and adapted to receive the said supporting rod, the lower end of said brace bar being secured to said swinging arm, a locking bar pivotally mounted on the wall of the building, the terminal of said brace bar being provided with an opening for the reception of one end of said locking bar, said locking bar being disposed rearwardly of and elevated above said restraining bar for contacting with the hind legs of the animal when said swinging arm is placed in operative position.

In testimony whereof I affix my signature in presence of two witnesses.

CHARLES R. TRIM.

Witnesses:
 A. J. FIRKINS,
 JOE BARTA.

Copies of this patent may be obtained for five cents each, by addressing the "Commissioner of Patents, Washington, D. C."